United States Patent [19]

Callender

[11] Patent Number: 5,276,696
[45] Date of Patent: Jan. 4, 1994

[54] LASER DOPPLER FREQUENCY CONTROL
[75] Inventor: Alan B. Callender, Stuart, Fla.
[73] Assignee: United Technologies Corporation, Hartford, Conn.
[21] Appl. No.: 290,777
[22] Filed: Dec. 28, 1988
[51] Int. Cl.[5] .............................. H01S 3/10
[52] U.S. Cl. ...................... 372/32; 372/020
[58] Field of Search ............ 330/4.3; 372/18, 20, 372/32

[56] References Cited

U.S. PATENT DOCUMENTS

| | | | |
|---|---|---|---|
| 3,686,585 | 8/1972 | Javan et al. | 372/32 |
| 3,899,748 | 8/1975 | Bodlaj | 372/32 |
| 4,823,354 | 4/1989 | Znotins et al. | 372/32 |
| 4,833,681 | 5/1989 | Akiyama et al. | 372/32 |
| 4,912,716 | 3/1990 | Mead | 372/32 |

Primary Examiner—Stephen C. Bentley
Attorney, Agent, or Firm—E. W. Petraske

[57] ABSTRACT

A pulse Doppler, laser radar as described which includes master laser whose output Fo is shifted in frequency by dF(t) during its amplification. The dF(t) frequency shift is compensated by providing a modulator which modulates the master laser output frequency Fo with a local oscillator signal Fl. A first mixer is provided which combines the shifted master laser frequency signal and the local oscillator modulated, master laser output so as to eliminate the master laser frequency Fo from the combined signals. A second mixer is provided for combining the reflected, Doppler shifted laser signal with the local oscillator modulated, master laser output signal Fo+Fl to eliminate the master laser output frequency Fo from the combined signal. Additional detection circuitry is provided to determine the difference in frequencies of the combined signals from the first and second mixers so as to isolate the Doppler shift signal from the amplifier-induced shift dF(t). An additional frequency control subsystem for the master laser is also described which employs an absorption cell in the feedback loop.

4 Claims, 2 Drawing Sheets

LASER DOPPLER FREQUENCY CONTROL

FIELD OF THE INVENTION

This invention relates to laser Doppler radars and more particularly to means for frequency stabilizing laser Doppler radars.

DESCRIPTION OF THE PRIOR ART

Laser radars, and more particularly laser-doppler radars are well known in the art. During the operation of Doppler laser systems, it is critical that the transmitted frequency be known with precision so that the frequency shift resulting from the Doppler effect can be determined accurately.

Many laser Doppler radars use a carbon dioxide laser which emits energy at 10.6 microns (long wave infrared). At low-to-moderate average power outputs, carbon dioxide lasers can emit a beam with as little as 2 kilohertz spectral spread which is acceptable for Doppler operation. At higher average and peak powers which are important for long range applications, carbon dioxide lasers, as well as others, exhibit substantially greater spectral spread. For instance, many lasers exhibit 150 KHz to 2 MHz drifts in their output spectrum. This problem is especially severe in pulsed Doppler systems where pulse modulation and pumping perturbs both the electron and excitation densities in the laser and its attendant amplifier system. These perturbations are especially severe in laser amplifiers where impulse pumping alters the index of refraction of the lasing medium and causes the amplifier's output to be phase modulated or "chirped". This results in a time varying, indeterminate frequency skew of the output spectrum. In pulse laser radars, this is not a problem as it is the pulse itself which is sensed by the ranging circuitry rather than its frequency content. In Doppler systems, however, the chirping creates a frequency shift in the pulse spectrum which, after target reflection and return to the receiver causes a skew in the sensed Doppler frequency with an attendant reduction in Doppler resolution.

In Doppler radars, it is also necessary to maintain the master laser frequency within a very small deviation band. While feedback systems exist in the prior art for controlling a laser frequency's spectrum, their ability to detect and correct very small frequency shifts is limited. This shortcoming, as well as the above described chirp problem has limited the capability of high power laser pulse Doppler radars.

Accordingly, it is an object of this invention to provide a laser, pulse Doppler radar system with improved frequency stability.

It is another object of this invention to provide a laser pulse Doppler radar with a means for correcting chirp variations in its spectral output while at the same time finely controlling the master laser frequency.

SUMMARY OF THE INVENTION

A pulse Doppler, laser radar is described which includes a master laser whose output Fo is shifted in frequency by dF(t) during its amplification. The dF(t) frequency shift is compensated by providing a modulator which modulates the master laser output frequency Fo with a known frequency local oscillator signal Fl. A first mixer is provided which combines the shifted master laser frequency signal and the local oscillator modulated, master laser output so as to eliminate the master laser frequency Fo from the combined signals. A second mixer is provided for combining the reflected, Doppler shifted laser signal with the local oscillator modulated, master laser output signal Fo +Fl to eliminate the master laser output frequency Fo from the combined signal. Additional detection circuitry is provided to determine the difference in frequencies of the combined signals from the first and second mixers so as to isolate the Doppler from the shift dF(t) signal. An additional frequency control subsystem for the master laser is also described which employs an absorption cell in the feedback loop.

DETAILED DESCRIPTION OF THE INVENTION

Figure 1:
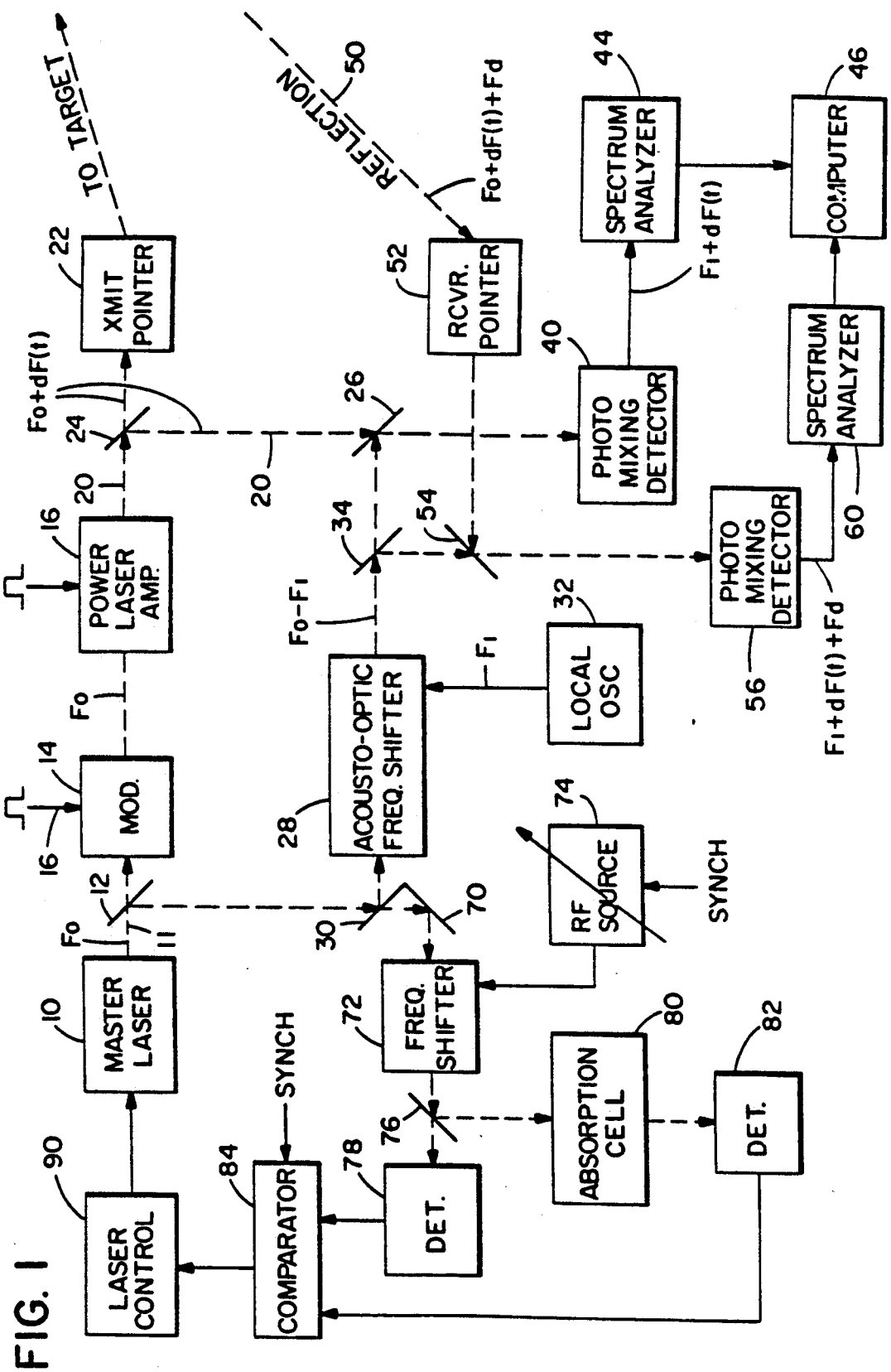
FIG. 1 is a block diagram of a pulse Doppler radar incorporating the invention.

Referring to FIG. 1, master laser 10 is a low level, high stability source of highly collimated, coherent radiant energy, preferably at a wavelength in the region of 10.6 microns. Master laser 10 provides a continuous wave output of frequency Fo. Its CW beam 11 is directed through half mirror 12 to modulator 14. While modulator 14 is shown as an independent element, it can be either inside or outside the cavity of master laser 10.

A pulse input applied to modulator 14 via line 16, gates open modulator 14 for a predetermined interval allowing the passage therethrough of beam 11 to power laser amplifier 16. A pulsatile pumping signal is applied to power laser amplifier 16 coincidently with or immediately preceding the application of the pulse output from modulator 14.

Several effects occur in modulator 14 and power laser amplifier 16 which reduce the temporal coherence of the modulated beam. Within modulator 14, there is some spectrum widening of the beam simply due to the pulse amplitude modulation. Within power amplifier 16, the application of the pumping energy modulates the excitation density over the optical path within the amplifier. The optical density of the optical gain medium thus changes over the pulse time and thus causes a time varying phase delay within the amplifier. In essence, a time varying alteration to the medium's index of refraction occurs within amplifier 16 and thereby creates a "chirp" phase modulation of the beam. The frequency alteration which results from this action is a function of time during the pumping interval and will be hereinafter referred to as dF(t) where dF(t) may be a + or − quantity or both. Thus the output from power laser amplifier 16 is a modulated laser beam 20 whose spectrum is Fo+dF(t). Beam 20 is fed to a transmitter pointer 22 which directs the pulse modulated beam towards a target in the well known manner.

If this system was a pulse-ranging radar, changes in the laser output frequency would not be significant to its operation. However, since this is a pulse-Doppler system, any change in the output frequency will tend to mask or alter the Doppler signal in the reflected beam. In order to eliminate the effect of the chirping, a feedback sampling system is provided for control purposes. Accordingly, a portion of the chirped output beam 20 is reflected by half mirror 24 towards a second half mirror 26. There, it is mixed with the output from an acoustical frequency shifter 28. One input to frequency shifter 28 is a portion of the output beam 11(Fo) from master laser 10 which was reflected by half mirror 12 to half mirror 30 and then towards frequency shifter 28. A local oscillator 32 provides a precisely controlled radio frequency output signal of frequency Fl to frequency shifter 28. While frequency Fl may be in the range of 1 MHz to 10 GHz, a typical output frequency is 250MHz. The choice is set by the detector bandwith and the expected Doppler shift.

Within the frequency shifter 28, preferably of the acousto-optic variety, the Fo beam is modulated by the local oscillator output signal Fl so that its spectrum exhibits both positive and negative sidebands of frequency Fl. A spatial filter (not shown) on the output side of frequency shifter 28, restricts the output beam emanating therefrom, to the difference sideband Fo−Fl. That beam is directed to half mirror 34, where it is both reflected to photomixer detector 56 and passed to half mirror 26 where it combines with output beam 20 from laser amplifier 16. The combined signals (Fo−Fl) and (Fo+dF(t)) then pass to photomixer detector 40 which combines the spectra in accordance with the following equation.

Output=(Fo+dF(t))±(Fo−Fl)

It should be understood that photomixer detector 40 and 56 are intensity detectors which detect the intensity of the incident net optical field. That intensity varies in time at the sum and difference frequencies similar to a time varying interferogram. Since however, photomixer detector 40 is not responsive to the additive mixer products, only the difference product or (Fl+dF(t)) passes to the output. This difference product is within the frequency range accessible to a radio frequency spectrum analyzer.

It can thus be seen that the lower sideband output from photomixer detector 40 effectively eliminates the master laser beam frequency Fo from the output and what results is an electrical signal at the local oscillator frequency Fl summed with the chirp frequency dF(t). This electrical signal is, in turn, fed to spectrum analyzer 44. Therein, frequency Fl+dF(t)) is identified, digitized and fed as an input to computer 46.

Assuming that a target is illuminated by the output of transmitter pointer 22, a reflection beam 50 is collected by receiver pointer 52. That beam is directed to mirror 54 where it is combined with the output from frequency shifter 28.

The spectrum of reflection beam 50 is Fo+dF(t)+Fd where Fd is the Doppler shift created by a moving or vibrating target. That signal, along with the (Fo−Fl) signal from frequency shifter 28 is fed to photomixer detector 56 where, as in photomixer detector 40, the Fo frequency is eliminated in accordance with the following:

Output=(Fo+dF(t)+Fd)±(Fo−Fl)

Output=Fl+dF(t)+Fd

As with photomixer detector 40, photomixer 56 is unable to respond to the upper additive sidebands from the mixed spectral products. Photomixer detector 56 feeds its output (an electrical signal) to spectrum analyzer 60. There, the signal is identified, digitized and fed to computer 46. Therein, the outputs from spectrum analyzer 44 and 60 are subtracted leaving only the Doppler frequency Fd for subsequent analysis. Range information can also be derived simultaneously.

It can thus be seen, that the above described system substantially eliminates any effect in the receiving portion of the system from the chirping and other spectral perturbation which occurs as a result of the pulse phase-modulation produced in the power amplifier.

A further problem may exist in the system which leads to error in its output scale. If there is variation in Fo from master laser 10, the entire Doppler measurement will be offset in scale by the amount of the spectral error. A feedback frequency control system is provided to analyze the frequency characteristics of beam 11 from master laser 10 and to provide feedback control signals which bring master laser 10 to its desired nominal condition.

As aforementioned, beam 11 from master laser 10 is reflected by mirror 12 towards half mirror 30. A portion of beam 11 passes through half mirror 30 and is reflected by full mirror 70 to frequency shifter 72. Another input to frequency shifter 72 is derived from swept RF source 74.

Figure 2:
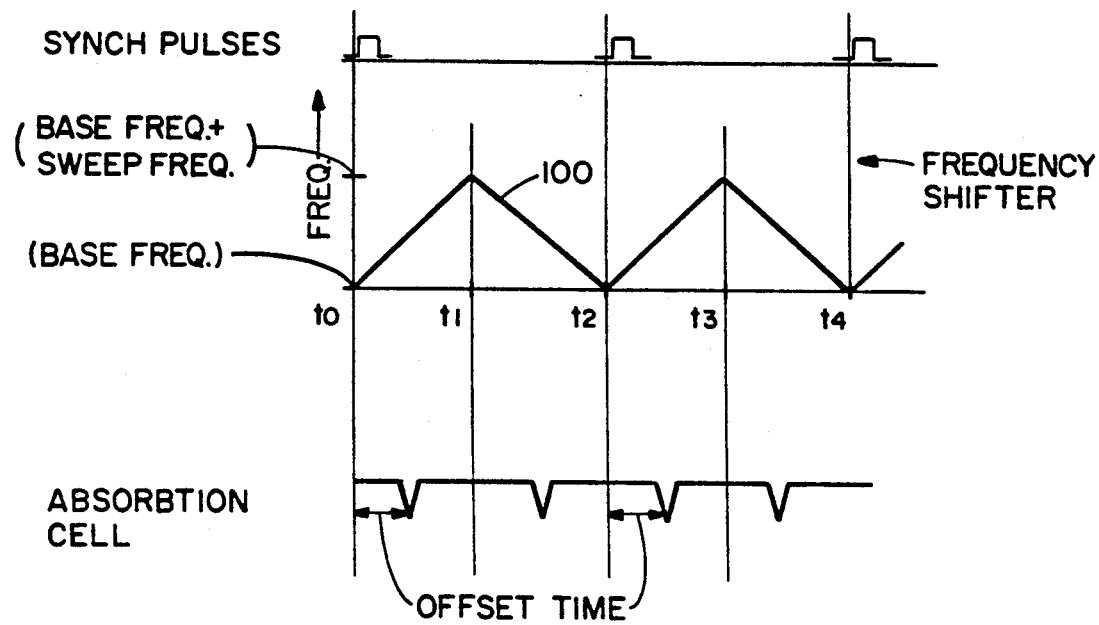
FIG. 2 is a waveform diagram helpful in understanding the operation, of the master laser frequency control system.

With reference to FIG. 2, the ramp-like Variation in frequency output from RF source 74 is illustrated by plot 100. A synchronizing input to RF source 74 causes its frequency to begin increasing to a maximum level and then at the mid point between synchronizing pulses, to commence regressing back to its base frequency. Thus, a "ramp" style frequency variation is supplied to frequency shifter 72 which in turn, electroptically modulates the incoming optical beam with the ramp variations in RF frequency. The swept frequency range for RF source 74 may be several hundred MHz and, in addition will vary from a base frequency to a sum frequency equal to the sum of the base frequency and the maximum sweep frequency.

The modulated output from frequency shifter 72 is directed to half mirror 76 which directs a portion of it to detector 78. Detector 78, in turn, provides a voltage level output indicative of the intensity of the sensed beam. Similarly, a portion of the beam from frequency shifter 72 is directed to an absorption cell 80. As is known, absorption cells are often used to calibrate optical instruments and provide very precise frequency standards. The absorption frequency of a cell is selectable in accordance with its included gas. In this case, the absorption frequency is selected to be a known frequency offset from the desired frequency Fo. That frequency offset is selected to be also within the range of variation in frequency output From RF source 74. Thus, when the spectral output of frequency shifter 72, as modulated by RF source 74, coincides with the absorption or "resonant" frequency of absorption cell 80, a significant drop results in the light intensity passing therethrough.

Figure 3:
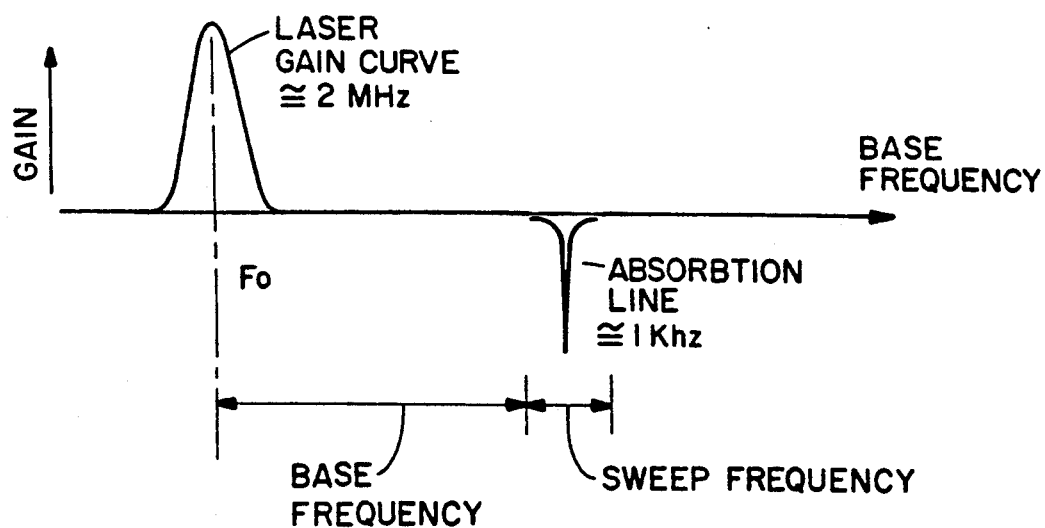
FIG. 3 is plot of gain versus frequency of the master laser cell showing its relationship to the absorption cell line.

As shown in FIG. 3, the laser gain curve is centered at Fo. The absorption line of absorption cell is separated therefrom by more than the base frequency of RF source 4, but within the range of its sweep frequency. Thus the absorption line need not be within the laser gain curve, allowing selection of an optimum cell with a very narrow characteristic (e.g., approximately 1 KHz). As shown in FIG. 2, the time between the commencement of the sweep of RF source 74 and the dip in output of absorption cell 80 is termed "offset time". If the master laser output's spectral frequency Fo is not at nominal (and does not vary between synch pulses), the offset times as measured during succeeding synch intervals are identical. If however, Fo changes, the offset time indications will change. It is the interval in time between each synch pulse and the pulse indicating a decrease in output from absorption cell 80, which is used to derive the frequency correction signal for master laser 10.

Referring back to FIG. 1 the output from absorption cell 80 is directed to detector 82 which converts the beam intensity to an electrical signal and feeds it to comparator 84. As aforestated the output from detector 78 is also fed to comparator 84 which determines the time at which the ratio of the incident intensities on detectors 78 and 82 dip so as to obtain a measurement of the offset time.

While there are many acceptable methods for obtaining the offset time measurement, one preferred system includes a counter within comparator 84 which commences its count at each synch pulse and terminates its count when the dip in output from absorption cell 80 is sensed. By then comparing the measured offset with a prestored standard count, the output variation can be detected and an appropriate correction signal presented to laser control 90. Depending upon the type of laser within master laser 10, laser control 90 may be a temperature control, a mirror position control (e.g. a piezo electric mirror) or other appropriate laser-controlling entity adapted to adjust the frequency of master laser 10 under its gain curve (see FIG. 3).

Referring back to FIG. 2, it should be noted that the output from RF source 74 exhibits both increasing and decreasing frequency characteristics, and that a pair of "dips" in intensity from absorption cell 80 are sensed between each synch pulse. Within comparator 84, the offset times for both dips between synch pulses are averaged to negate any difference in transmission time through the absorption cell/detector arrangement shown in FIG. 1.

The elements of the system used to construct this invention are available as stand-alone items in the marketplace. For instance, suitable photo mixing detectors (i.e., mercury cadmium telluride photovoltaic detectors) are available from New England Research Center, Minuteman Drive, Longfellow Ctr., Sudbury, Mass., 01776. Appropriate acousto-optic frequency shifters are available from IntraAction Corp., 3719 Warren Ave., Bellwood, Ill., 60104. One type of electro-optic modulator which will function properly in this system is a cadmium telluride Pockels cell available from the 2-6 Corporation, Saxonburg Blvd., Saxonburg, Pa.

It should be understood that the foregoing description is only illustrative of the invention. Various alternatives and modifications can be devised by those skilled in the art without departing from the invention. For instance, while comparator 84 is shown as a separate entity, its function could be just as readily carried out by computer 46. Accordingly, the present invention is intended to embrace all such alternatives, modifications and variances which fall within the scope of the appended claims.

I claim:

1. In a system for controlling the frequency of a laser's output beam, when it departs from its nominal frequency Fo, the combination comprising:
   means for frequency shifting said beam by a known amount over a predetermined time period;
   an absorption cell in the path of said beam, exhibiting an absorption characteristic at a frequency within the range of said frequency shift;
   means for comparing when said absorption characteristic occurs within said predetermined time period, to a standard time interval and generating a laser control signal; and
   means responsive to said control signal to modify the output frequency of said laser.

2. The invention as defined in claim 1 whenever said absorption characteristic does not lie within the gain curve of said laser.

3. The invention as defined in claim 2 wherein said standard time interval is equal to the time between commencement of said frequency shift when said laser beam is at its nominal output frequency Fo, and the occurrence of said absorption characteristic.

4. The invention as defined in claim 3 wherein said means for comparing includes a first detector for providing an indication of the intensity of said frequency shifted laser beam and a second detector for providing an indication of said absorption characteristic and means for comparing said indications.

* * * * *